June 13, 1967 J. H. GRAYSON 3,325,723

VOLTAGE-CURRENT CHARACTERISTIC SIMULATOR

Filed Nov. 27, 1964 3 Sheets-Sheet 1

Jerome H. Grayson
INVENTOR.

BY [signature]
M. J. Marnock
ATTORNEYS

Jerome H. Grayson
INVENTOR.

BY [signature]
[signature]
ATTORNEYS

June 13, 1967 J. H. GRAYSON 3,325,723

VOLTAGE-CURRENT CHARACTERISTIC STIMULATOR

Filed Nov. 27, 1964 3 Sheets-Sheet 3

Jerome H. Grayson
INVENTOR.

BY [signature]
[signature]
ATTORNEYS 3,325,723

VOLTAGE-CURRENT CHARACTERISTIC SIMULATOR

Jerome H. Grayson, Houston, Tex., assignor to the United States of America as represented by the Administrator of the National Aeronautics and Space Administration Filed Nov. 27, 1964, Ser. No. 414,482
6 Claims. (Cl. 323—8)

The invention described herein may be manufactured and used by or for the government of the United States of America for governmental purposes without the payment of any royalty thereon or therefor.

This invention relates generally to a photovoltaic characteristic simulator, and more particularly to a device for simulating the voltage-current characteristics of a solar cell panel.

The photovoltaic solar energy converter is extensively used as an auxiliary power source for space vehicles and satellites with long term missions. Solar cells, for instance, which utilize the photovoltaic effect at a P-N junction in single crystal silicon to convert solar energy into electricity have been the most successful long life power sources in satellites. Considerable research and development is currently directed toward further development of photovoltaic cells as power sources, and in testing their suitability as power sources for a wide variety of equipment. Heretofore, equipment to be operated by means of solar cell panels has been tested by using variable power supplies to simulate the panel power output. These, however, do not provide for a continuous voltage-current function simulating a solar panel. Also the use of actual solar panels for equipment testing is expensive and bulky.

The simulator of this invention which has been devised to overcome these problems, is an extension of the equivalent circuit for a single photovoltaic cell which may be represented as a constant current generator shunted by an ideal diode junction, shunt capacitance and resistance branches, and a branch including the internal resistance of the cell and the load resistance in the external circuit. In lieu of the single diode branch of the photovoltaic cell equivalent circuit, the simulator of this invention uses a diode string in series with a variable resistance and a variable reverse bias voltage supply. A selective switching means is provided for controlling the number of diodes which may be placed in the circuit and the shunt resistance 19 and load resistance of the single cell equivalent circuit are represented in the simulator by variable shunt resistors. By proper choice of simulator components and selected values of its variable components, it is possible to control the voltage-current outputs of the simulator to simulate the voltage-current characteristic curves of a solar cell panel with different operational parameters. The simulator can therefore be controlled to account for such factors as illumination intensity, temperature, efficiency, orientation of the panel array, and like factors which affect the voltage-current characteristic of a photovoltaic panel and is also adaptable to functionally simulate various series-parallel combinations of cells which may be used as panel components.

Other objects and many of the attendant advantages of this invention will be readily appreciated as the same become better understood by reference to the following detailed description when considered in connection with the accompanying drawings in which like reference numerals designate like parts throughout the figures thereof and wherein.

Figure 1:
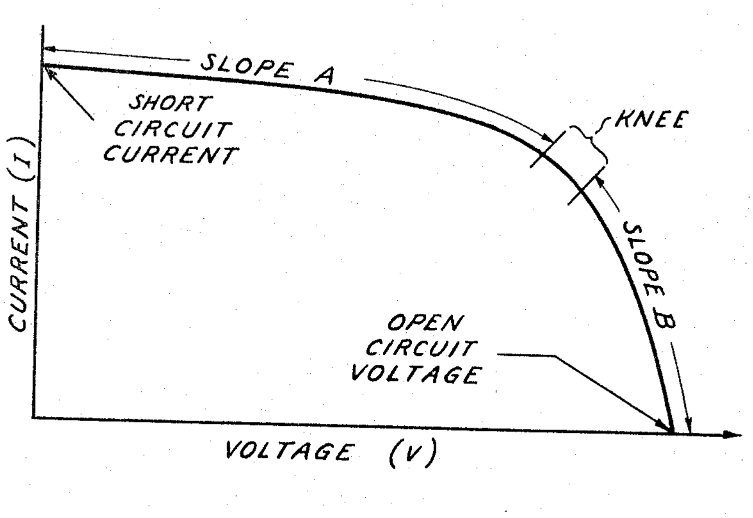
FIGURE 1 is a representative voltage-current characteristic curve for a typical photovoltaic panel.

Referring more particularly to the drawings, there is shown in FIG. 1 a typical voltage-current characteristic curve 10 for a panel of photovoltaic cells. For any given panel configuration, the short circuit current is primarily determined by the number of cells in parallel in the panel and the intensity of the illumination. It varies, however, proportionately with the intensity whereby the greater the intensity the higher is the short circuit current. The open circuit voltage also depends primarily on the number of cells in series whose outputs are additively combined in the panel, and varies inversely with temperature, causing power to decrease substantially linearly with increasing temperature. The slopes A and B of the intermediate sections of the curve, indicated in the figure, are primarily functions of temperature and efficiency. The curvature of the "knee" section of the characteristic curve and the voltage range over which it occurs depend principally on temperature and array configuration. All of the operational parameters of the panel, of course, affect the features of the curve to some extent, but their effects are negligible in comparison with those of the parameters noted.

Figure 2:
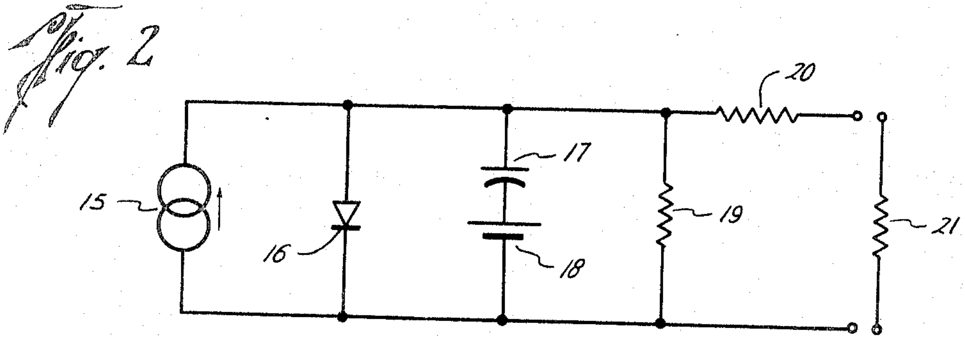
FIGURE 2 shows the equivalent circuit of a single photovoltaic cell.

The simulator of this invention utilizes a circuit which is an extension of the equivalent circuit for a single photovoltaic cell. As shown in FIG. 2, the equivalent circuit of a single cell may be represented as a constant current generator 15 which delivers current to a parallel circuit including an ideal diode junction 16 in one branch, a shunt capacitance 17 in series with a voltage source 18 in a second branch, a shunt resistance 19 and a branch including the internal resistance 20 of the cell connected in series with the load resistance 21 of the external circuit. The capacitance 17 corresponds to the junction capacitance of the diode, the voltage 18 to the voltage across the junction, and the shunt resistance 19 to the leakage current resistance. In normal operation, the diode junction is forward-biased and drains off part of the total current delivered by the generator.

Figure 3:
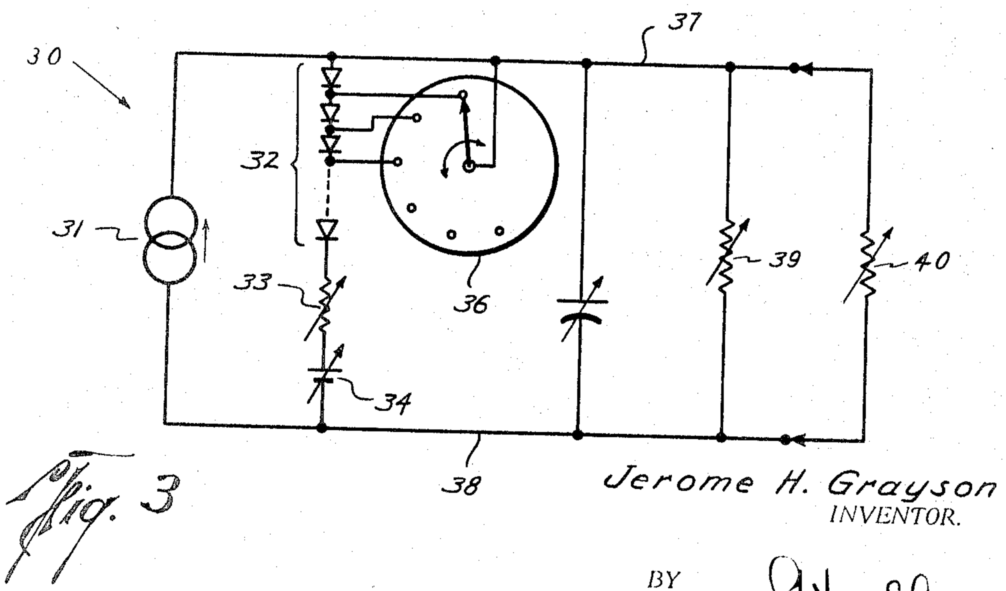
FIGURE 3 is a schematic circuit for the simulator of this invention.

The basic circuit for the simulator 30 of this invention, shown in FIG. 3, includes a constant current supply 31 and in lieu of the single diode in the photovoltaic cell equivalent circuit, utilizes a string of series-connected diodes 32 in series with a variable resistance 33 and a variable reverse bias voltage supply 34. A selector switch 36 controls the number of diodes in circuit across the main line conductors 37 and 38. In addition, the shunt resistance of the single cell equivalent circuit is represented in the simulator by a variable resistance 39 and the load by a variable resistance 40.

Since the total currrent delivered by the generator equals the sum of the currents in the parallel branches, a variation in the number of diodes in circuit affects the diode "break" voltage and current in the diode branch, and consequently the load current and voltage across the load.

The "break" voltage may be defined as the voltage at which there is a marked decrease in forward resistance of a diode and therefore a marked increase in forward current. Likewise, a change in the variable resistance 33 similarly affects the currents in the diode branch and the load and the voltage across the load. The magnitude of the reverse bias voltage controls the "break" voltage of the diodes and is therefore likewise a factor in determining current through the diode branch. Hence, by changing either the value of the series resistance 33, the reverse bias voltage, or the number of diodes in circuit, it is possible to control output current and output voltage of the simulator as measured across the load, and thereby simulate the voltage-current characteristic of a panel of photovoltaic cells by recording current and voltage as the load is varied. In like manner, variation of the shunt resistance 39 can be used to alter the slopes of the voltage-current characteristic of the simulator.

Figure 4:
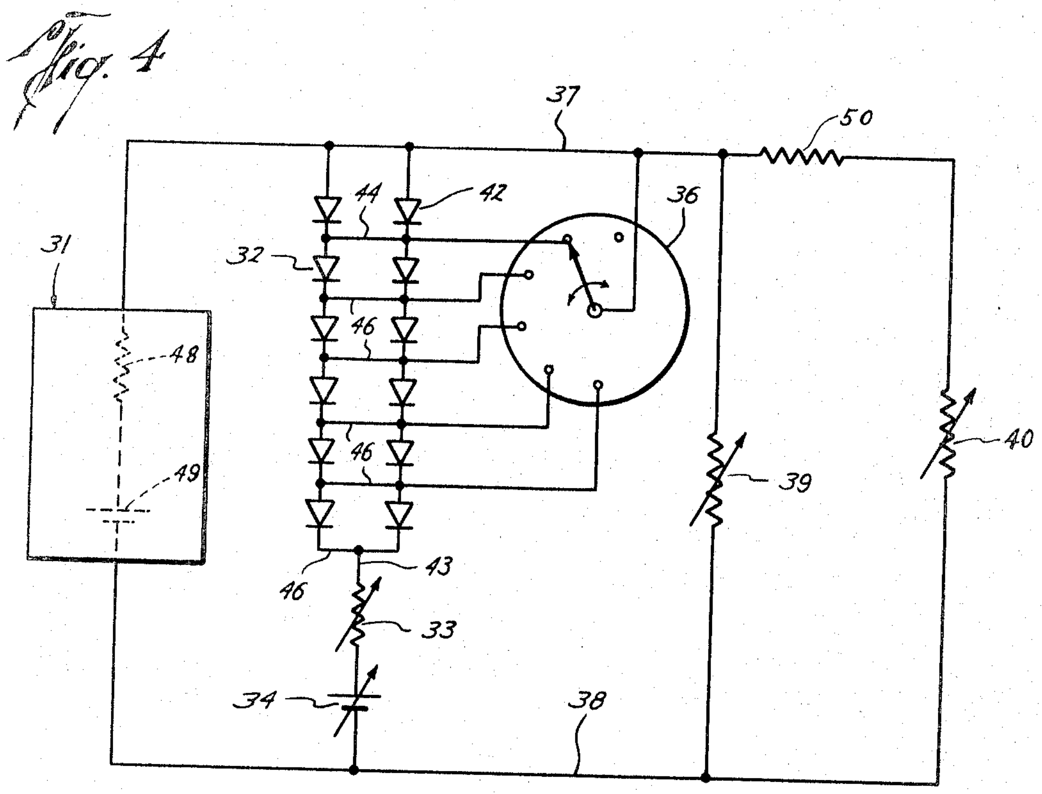
FIGURE 4 is a schematic circuit for a modified form of the simulator of this invention.

Since the short-term electrical transient response of a photovoltaic panel is rarely of interest, the junction capacitance may be omitted from the simulator as shown in FIG. 4 in the preferred embodiment 30*a* of the simulator. Also, for increasing the current carrying capacity of the diode branch, the simulator 30*a* utilizes a string of series-connected diodes 42 in series-parallel with a string of series-connected diodes 32 with both strings connected in series with the variable resistor 33. Each diode 42 is connected in parallel with a corresponding diode 32 by means of a pair of conductors 46 whereby series-parallel combinations of the diodes may be connected in circuit across the conductors 37 and 38 by the selector switch 36, each contact of which is connected to a conductor 46. By the arrangement shown in FIG. 4, the number of pairs of parallel-connected diodes which are connectable in circuit is variable from 1 to 6. In addition, for measuring current a sampling resistor may be placed in series with the load.

The portion of the voltage-current characteristic of major interest is the "knee" of the curve since this is where maximum power occurs. The voltage range over which the "knee" breaks is a function of the diode characteristic whereby the greater the forward resistance of the diode, the broader the break range. Consequently, the break range of the "knee" can be increased by increasing the number of series diodes in circuit.

In one model of the simulator 30*a*, a substantially constant current supply was obtained by using a 1,000 ohm, 100 watt resistor 48 in series with a 300 volt D.C. power supply 49, although various constant-current generators could be used. A number of voltage-current characteristics were obtained with this simulator using a variable resistance 40 as the load.

Figure 5:
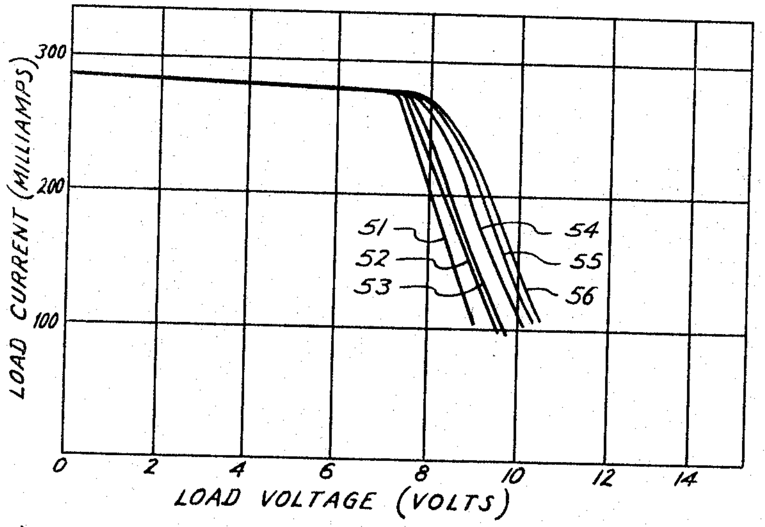
FIGURE 5 shows a family of voltage-current curves for the simulator of this invention in which a given value of series resistor in the diode branch is used and the number of diodes in the circuit are varied.

The family of curves 51–56 shown in FIG. 5, shows how the characteristics vary as the number of diodes in the circuit are increased from 1 to 6 for curves 51–56, respectively. For this family of curves a resistance of 5 ohms was used for the value of the series resistor 32 and a voltage of 6 volts was used in the simulator for reverse biasing the diodes. A value of 6,500 ohms was used for the shunt resistor 38. As may be readily observed from these curves, the greater the number of series diodes which are placed in the circuit, the broader is the "knee" of the curve. The particular diodes used (IN 91) have a forward voltage drop at beginning of conduction of between 0.35 and 0.4 volt, and thus the "knee" extended approximately over a range of from .35 to 2.4 volts, depending on the number of diodes used. Other type silicon diodes of course, could also be used.

Figure 6:
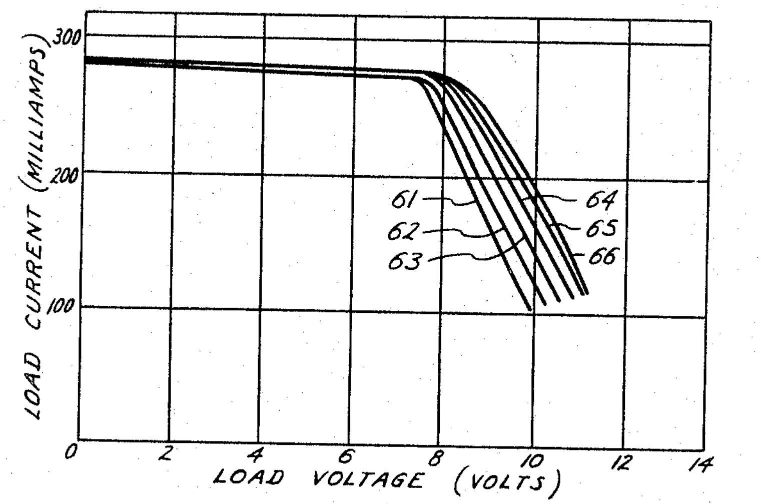
FIGURE 6 shows a family of voltage-current curves similar to the curves of FIGURE 5, but obtained when using a different value of series resistance in the diode branch.

FIG. 6 shows a family of voltage-current curves 61–66 obtained as were the curves of FIG. 5, but when using a value of 10 ohms instead of 5 ohms for the series resistance in the diode branch. Comparison of the curves in FIG. 6 with those in FIG. 5 shows that as the resistance is increased, the lower portion of the curve below the "knee" tends to flatten out and the no-load voltage increases.

Figure 7:
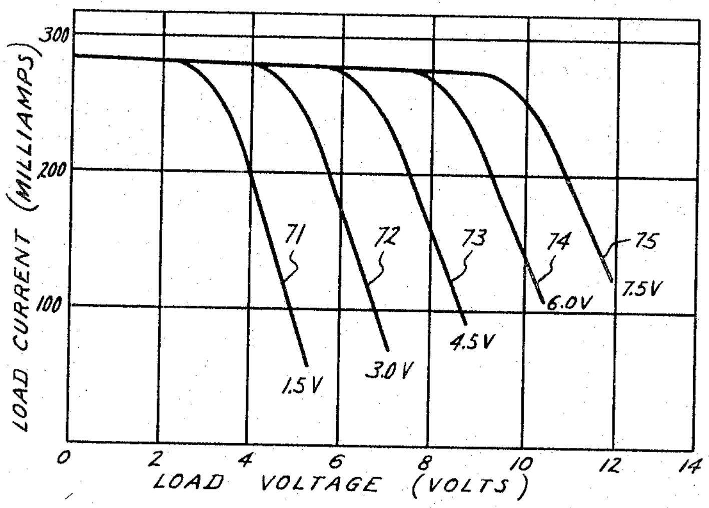
FIGURE 7 shows a family of voltage-current curves for the simulator of this invention in which the diodes in circuit are biased with different values of reverse bias voltage.

FIG. 7 shows a family of voltage-current curves 71–75 for the simulator 30*a* in which the diodes in circuit are biased with different values of reverse bias voltage. These curves were obtained from the simulator when using a series resistor of 6 ohms in the diode branch, a shunt resistance of 6,500 ohms, and 6 series diodes in circuit. From these curves, it may be seen that the "knee" voltage can readily be increased by simply increasing the value of the bias voltage. It is to be noted that since all other parameters are kept constant, all of the curves 71–75 have the same slopes above and below the "knee" and the voltage range over the "knee" remains substantially constant.

Figure 8:
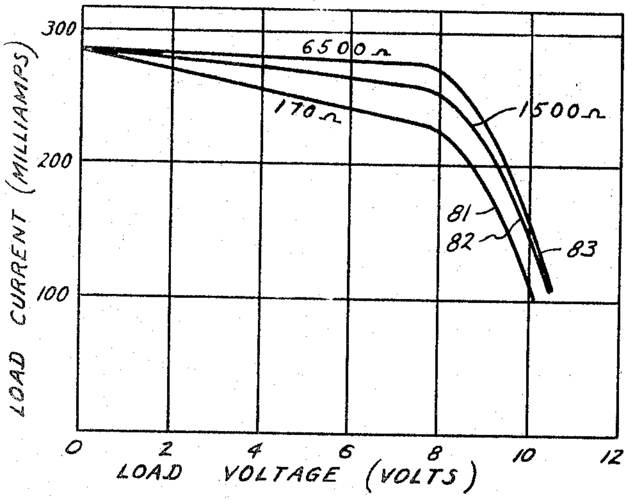
FIGURE 8 shows a family of voltage-current curves for the simulator of this invention as obtained with different values of the shunt resistance in the simulator.

FIG. 8 shows a family of voltage-current curves 81–83 which were obtained by varying the value of the shunt resistance while all other parameters are held constant. In obtaining these curves, a series resistance of 5 ohms, a reverse bias voltage of 6 volts, and 6 diodes were used in circuit. As may be readily noted, the short circuit current for each of these curves remains the same, but a definite change is seen in slope from short circuit conditions to the "knee" of each curve. For each curve, the slope of this section approached the horizontal as the value of the shunt resistance increased. Beyond the "knees" of the curves, however, the slopes are substantially the same, but the curves tend to be shifted to the left due to increased leakage through the shunt resistor to higher load resistances.

It will therefore be seen that by the simulator of this invention the voltage-current characteristics of a photovoltaic panel with various operational parameters may be readily reproduced. With the simulator of this invention it is possible to simulate the short circuit current of the panel by controlling the constant current generator output, and to simulate the open circuit voltage of the panel by proper changes of the reverse bias voltage for the diodes and the number of diodes in circuit. The voltage at which the "knee" occurs is readily controllable by varying the voltage bias of the diodes, and the curvature of the "knee" is dependent on the number of series diodes placed in circuit. It is also possible to control the slope of the characteristic curve before the "knee" by adjustment of the shunt resistor in the simulator and the slope of the curve beyond the "knee" by adjusting the value of the resistance in series with the diodes.

It should also be understood, of course, that the foregoing disclosure relates only to preferred embodiments of the invention and that it is intended to cover all changes and modifications of the examples in the invention herein chosen for the purposes of the disclosure and which do not constitute departure from the spirit and scope of the invention.

What is claimed and desired to be secured by Letters Patent is:

1. A device for simulating the voltage-current characteristics of a battery of photovoltaic cells, said device comprising:
   - constant current generator means having a pair of terminals;
   - first and second conductors connected respectively to the terminals of said constant current generator means;
   - a string of series-connected diodes;
   - a first variable resistance means in series with said diode string, said diodes and first variable resistance means being connected to said conductors in shunt with said constant current generator means;
   - second and third variable resistance means, each said second and third variable resistance means being connected to said conductors in shunt with said constant current generator means;
   - means for applying a reverse bias voltage to said string of diodes; and
   - switching means for selectively controlling the number of said diodes which are connected in circuit.

2. A device for simulating the voltage-current characteristics of a battery of photovoltaic cells, said device comprising:
- constant current generator means having a pair of terminals;
- first and second conductors connected respectively to the terminals of said constant current generator means;
- a string of series-connected diodes;
- a first variable resistance means in series with said diode string, said diodes and first variable resistance means being connected to said conductors in shunt with said constant current generator means;
- a variable capacitive means connected to said conductors in shunt with said constant current generator means;
- second and third variable resistance means, each said second and third variable resistance means being connected to said conductors in shunt with said constant current generator means;
- means for applying a reverse bias voltage to said string of diodes; and
- switching means for selectively controlling the number of said diodes which are connected in circuit.

3. A device for simulating the voltage current characteristics of a battery of photovoltaic cells, said device comprising:
- constant current generator means;
- a string of series-connected diodes;
- a first variable resistance means in series with said diode string;
- a voltage source connected in series with said first variable resistance means for reverse biasing said diodes, said diodes, first variable resistance means, and said voltage source being connected in shunt with said constant current generator means;
- second and third variable resistance means, each said second and third variable resistance means being connected in shunt with said constant current generator means; and
- switching means for selectively controlling the number of said diodes which are connected in circuit.

4. A device for simulating the voltage-current characteristics of a battery of photovoltaic cells, said device comprising:
- a first and a second input terminal;
- a first and a second output terminal;
- a sampling resistive means connecting said first input terminal with said first output terminal, said second input terminal being connected to said second output terminal;
- a constant current source connected across said input terminals;
- a string of series-connected diode means;
- a first variable resistance means in series with said diode means, said diodes and first variable resistance means being connected across said first and second input terminals;
- a second variable resistance means connected across said input terminals;
- means for applying a reverse bias voltage to said diode means;
- switching means for selectively controlling the number of diode means which are connected in circuit; and
- a third variable resistance means connected across said output terminals.

5. A device for simulating the voltage-current characteristics of a panel of photovoltaic cells, said device comprising:
- a constant current generator having a pair of terminals;
- first and second conductors connected respectively to the terminals of said constant current generator;
- a plurality of pairs of parallel-connected diode means, said pairs being electrically connected in series;
- a first variable resistance means in series with said pairs of diodes, said diode means and first variable resistance means being connected to said conductors in shunt with said constant current generator;
- second and third variable resistance means, each said second and third variable resistance means being connected to said conductors in shunt with said constant current generator;
- means for applying a reverse bias voltage to said diode means; and
- switching means for selectively controlling the number of diode means which are connected in circuit.

6. A device for simulating the voltage-current characteristics of a panel of photovoltaic cells, said device comprising:
- a constant current generator having a pair of terminals;
- first and second conductors connected respectively to the terminals of said constant current generator;
- a plurality of pairs of parallel-connected diode means, said pairs being electrically connected in series;
- a first variable resistance means in series with said pairs of diodes, said diodes and first variable resistance means being connected to said conductors in shunt with said constant current generator;
- a variable capacitive means in shunt with said constant current generator;
- second and third variable resistance means, each said second and third variable resistance means being connected to said conductors in shunt with said constant current generator;
- means for applying a reverse bias voltage to said diodes; and
- switching means for selectively controlling the number of diode means which are connected in circuit.

No references cited.

JOHN F. COUCH, *Primary Examiner.*

M. L. WACHTELL, *Assistant Examiner.*